United States Patent
Hofner et al.

(10) Patent No.: US 10,179,373 B2
(45) Date of Patent: Jan. 15, 2019

(54) METHOD FOR PRODUCING SMALL BORES IN WORK PIECES BY CHANGING AN OPERATING PARAMETER WITHIN A BEAM PULSE

(71) Applicant: PRO-BEAM AG & CO. KGAA, Gilching (DE)

(72) Inventors: Michael Hofner, Germering (DE); Sven Juergens, Linsengericht/Grossenhausen (DE)

(73) Assignee: PRO-BEAM AG & CO. KGAA, Gilching (DE)

( * ) Notice: Subject to any disclaimer, the term of this patent is extended or adjusted under 35 U.S.C. 154(b) by 0 days.

(21) Appl. No.: 15/127,977

(22) PCT Filed: Mar. 19, 2015

(86) PCT No.: PCT/EP2015/000600
§ 371 (c)(1),
(2) Date: Sep. 21, 2016

(87) PCT Pub. No.: WO2015/139840
PCT Pub. Date: Sep. 24, 2015

(65) Prior Publication Data
US 2017/0120371 A1 May 4, 2017

(30) Foreign Application Priority Data
Mar. 21, 2014 (DE) .................. 10 2014 004 035

(51) Int. Cl.
*B23K 15/00* (2006.01)
*B23K 15/08* (2006.01)
(Continued)

(52) U.S. Cl.
CPC ........ *B23K 15/085* (2013.01); *B23K 15/0013* (2013.01); *B23K 15/02* (2013.01); *B23K 15/10* (2013.01)

(58) Field of Classification Search
CPC ....... B23K 15/085; B23K 15/02; B23K 15/08
(Continued)

(56) References Cited

U.S. PATENT DOCUMENTS

| | | | |
|---|---|---|---|
| 3,179,542 A | 4/1965 | Quinn et al. | |
| 3,371,190 A * | 2/1968 | Meyer | B23K 15/08 219/121.12 |

(Continued)

FOREIGN PATENT DOCUMENTS

| | | |
|---|---|---|
| DE | 100 54 853 A1 | 8/2002 |
| DE | 101 62 379 A1 | 7/2003 |

(Continued)

OTHER PUBLICATIONS

Schulze, K.-R.: Schweisen and Schneiden Wissen kompakt. Band 1 Elektronenstrahltechnologien. Düsseldorf: DVS Media GmbH, 2011.—ISBN 978-3-87155-255-0.

*Primary Examiner* — Mark Paschall
(74) *Attorney, Agent, or Firm* — Schroeder Intellectual Property Law Group, LLC

(57) ABSTRACT

A method for producing in particular conical bore holes in work pieces, wherein the contouring and cross-sectional form of the bore hole can be influenced in that one or a plurality of operating parameters are changed, which parameters are elected from the following group: pulse length, beam diameter, beam current, acceleration voltage, beam focusing, deviation of the electron beam from a beam axis, movement velocity of the electron beam over the work piece.

22 Claims, 4 Drawing Sheets

(51) Int. Cl.
*B23K 15/02* (2006.01)
*B23K 15/10* (2006.01)

(58) Field of Classification Search
USPC .............. 219/121.2, 121.18, 121.28, 121.25, 219/121.12
See application file for complete search history.

(56) References Cited

U.S. PATENT DOCUMENTS

| | | | |
|---|---|---|---|
| 3,632,398 A | | 1/1972 | Konig |
| 3,649,806 A | * | 3/1972 | Konig ................... B23K 15/085 219/121.6 |
| 5,534,677 A | * | 7/1996 | Elmer ................ B23K 15/0013 219/121.13 |
| 8,653,411 B2 | | 2/2014 | Geisel |
| 9,364,916 B2 | | 6/2016 | Geisel et al. |
| 2008/0197120 A1 | | 8/2008 | Beck et al. |
| 2009/0212032 A1 | | 8/2009 | Geisel |
| 2012/0080415 A1 | | 4/2012 | Geisel et al. |

FOREIGN PATENT DOCUMENTS

| | | |
|---|---|---|
| DE | 10 2009 024 117 A1 | 12/2010 |
| EP | 1 681 128 A1 | 7/2006 |
| EP | 2 095 904 A2 | 9/2009 |
| GB | 1 323 930 | 7/1973 |

\* cited by examiner

METHOD FOR PRODUCING SMALL BORES IN WORK PIECES BY CHANGING AN OPERATING PARAMETER WITHIN A BEAM PULSE

RELATED APPLICATIONS

This application is a national phase of International Patent Application No. PCT/EP2015/000600, filed Mar. 19, 2015, which claims the filing benefit of German Patent Application No. 10 2014 004 035.6, filed Mar. 21, 2014, the contents of both of which are incorporated herein by reference.

FIELD OF THE INVENTION

The invention relates to a method for producing small bores in work pieces by using an electron beam.

BACKGROUND OF THE INVENTION

If an electron beam is directed at a work piece, in particular a metallic work piece, the electron beam introduces energy into the material in a very concentrated manner, whereby the latter is melted. Material may also vaporize in the process, creating in the material a depression that has small transversal dimensions and reaches all the deeper into material the longer the latter has been irradiated by the electron beam at the location concerned.

The effectiveness of the drilling can be increased by the molten metal being driven out of the material by a gas which the electron beam generates from an underlay that is arranged behind the work piece.

The present invention aims to provide such a method.

SUMMARY OF THE INVENTION

It is provided according to the invention that at least one operating parameter that is selected from the following group of parameters is changed: beam diameter, beam current, pulse duration, beam focusing, relative deviation of the electron beam from an equipment axis, path velocity of the electron beam over the work piece and stretch energy. This achieves the effect that the geometry of the bore hole can be varied. The change takes place in this case within a beam pulse. This is also of advantage with regard to the aim that the machining can be carried out within as short a time as possible. It can also be ensured in this way that, apart from the parameters that are changed as desired, the other operating conditions remain the same. In this way, the effect of the change can be foreseen well.

The variants specified have in common that they vary the way in which the energy is introduced and, by this variation, make a correspondingly varying melting of material possible, and consequently a varying geometry of the bore.

The contour is to be understood here as meaning the generatrix that the wall of the bore produces during rotation about the beam axis. In other words, the contour is the line that the wall of the bore represents in the axial sectional view of the bore hole. Contours may in particular be lines extending obliquely in relation to the beam axis, which correspond to a conical or frustoconical bore, or be convex or concave lines, which correspond to bores made to bulge or to bores having constrictions.

The form is to be understood here as meaning the form of the transversal cross section of the bore.

The present invention may also provide additional advantageous developments.

For example, according to another aspect of the invention, two or more operating parameters from the group of parameters may be changed. This allows a still finer setting of the deviation of the wall of the bore from a cylindrical form.

The aim of allowing a still finer setting of the deviation of the wall of the bore from a cylindrical form may be achieved by changing at least two of the two or more operating parameters at the same time. Changing at least two of the changed operating parameters one after the other may also allow a still finer setting of the deviation of the wall of the bore from a cylindrical form.

According to another aspect of the invention the machining time comprises two or more movement cycles of the electron beam over the work piece, preferably 2 to 50 movement cycles, more preferably 2 to 20 movement cycles, more preferably 2 to 10 movement cycles. Such machining times have advantage with regard to a short machining time for producing a bore with good quality of the wall.

According to another aspect of the invention, a first beam run the work piece is only melted incompletely over its thickness and in a final circulation of the beam, preferably toward its end, the surface of the underlay is reached which may be of advantage with regard to particularly effective and rapid blowing out of molten metal from the bore hole.

According to another aspect of the invention, in at least one of the last cycles, preferably the last five cycles, the electron beam is advanced in the radial direction by a distance that corresponds to a small fraction of the beam diameter, preferably approximately 2% to approximately 5% of the beam diameter. Advancing the electron beam in this manner has an advantage with regard to particularly good surface quality of the wall of the bore.

According to another aspect of the invention, the bore may be produced by two, three, etc. successive beam pulses which achieves the effect that contoured bores can also be produced in thicker materials.

According to another aspect of the invention, with the first beam pulse, the work piece is melted to a depth that is at least approximately half, one third, etc. of the thickness of the work piece, though the underlay is not yet reached, and, with the second, third, etc. beam pulse, the melting through of the remaining piece of material to the underlay takes place and the walls of the part of the bore produced by first preceding beam pulses are passed over which is of advantage again with regard to good removal of liquid material from the bore hole.

According to another aspect of invention, the second, third, etc. beam pulse differs from the first beam pulse by one of its parameters selected from the stated group of parameters, i.e. at least one operating parameter selected from the following group of parameters may be changed: beam diameter, beam current, pulse duration, beam focusing, relative deviation of the electron beam from an equipment axis, path velocity of the electron beam over the work piece and energy per unit length. This is of advantage with regard to increased variability of the production of a bore. Thus, the properties of the successive beam pulses could be chosen to vary more than is possible in the course of one pulse, in order to obtain desired properties of portions of a bore that vary more.

According to another aspect of the invention, the movement velocity and the path on which the electron beam is guided for the purpose of the machining are made to match one another such that at least one portion of the bore is passed over twice during the production of the same which Machining in this manner is of advantage with regard to good surface quality of the wall of the bore hole.

According to another aspect of the invention, the path of the electron beam is run through incrementally which allows on the one hand techniques such as are commonly used in digital drawing to be used for the guidance of the electron beam. In addition, by incremental advancement of the electron beam, the dwell times of the electron beam at a predefined location can be changed in an easy way, in that the deflection to the next point on the path is prolonged or shortened.

According to another aspect of the invention, the electron beam is guided successively on paths of which the spacing in the direction perpendicular to the direction of movement of the beam is smaller than the beam diameter, preferably 10 to 40% of the same, more preferably 15 to 25% of the same. Guiding the electron beam in this manner is of advantage with regard to making procedures that are used in digital drawing usable. Here, curves that are geometrically similar but differ only in scale can be derived from one another in a very easy way. The specified matching of the spacing of the various paths to the beam diameter are of advantage with regard to sufficient melting of the material of the work piece while avoiding unnecessary transfer of this material into the gas phase.

According to another aspect of the invention, after completion of the bore, the electron beam is guided over the periphery of the material surrounding the bore, preferably with reduced energy in such a way that the material of the work piece is no melted and not vaporized. Guiding the electron beam in this manner reduces the risk of thermally induced internal stresses in the surroundings of the bore.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention is explained in more detail below on the basis of exemplary embodiments with reference to the drawing, in which.

DETAILED DESCRIPTION OF THE PRESENT INVENTION

Figure 1:
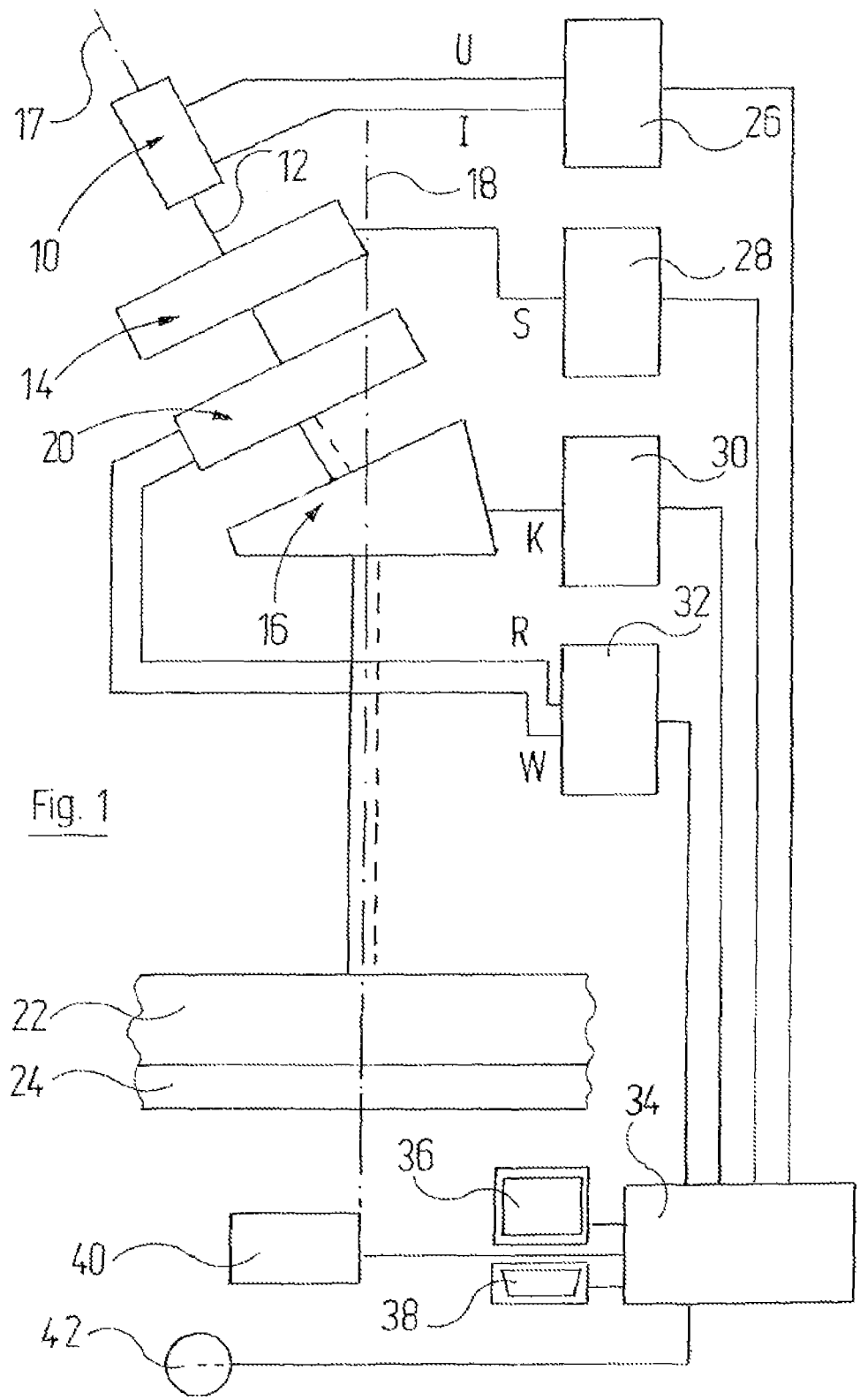
FIG. 1 shows a schematic representation of an electron beam machine and of the electronics necessary for its operation.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The electron beam machine shown in FIG. 1 has an electron gun, which is designated overall by 10 and generates an electron beam 12. Provided behind the electron gun 10 is a focusing unit 14, which may comprise one or more electrostatic or electromagnetic lenses.

Behind the focusing unit 14 there is in the beam path a deflecting unit 20, which displaces the electron beam 12 substantially parallel to the axis 17 of the electron gun 10 in two independent coordinate directions. It is assumed for the purposes of the present description that this displacement can be described by polar coordinates, that is to say the radius R at which the electron beam 12 is met and the angle W, which is measured in a reference plane imagined as perpendicular to the direction of the beam, with respect to a reference direction lying in the reference plane.

Provided behind the deflecting unit 20 is a diverting unit 16, which diverts the electron beam 12 to an equipment axis 18.

Behind the diverting unit 16, the electron beam 12 impinges on a work piece 24, behind which an underlay 24 is located.

Connected to the electron gun 10 is a gun-control unit 26, which predefines and provides the acceleration voltage U and the beam current I.

Provided for the focusing unit 14 is a focus-control unit 28, which provides a signal S predefining the focal position.

A diversion-control unit 30 provides for the diverting unit 16 a constant signal K, which predefines the tilting angle of the electron beam 12 in the diverting unit 16.

Operating together with the deflecting unit 20 is a deflecting controller 32, which provides two independent control signals R and W, of which one (R) predefines the radial distance of the electron beam 12 from the gun axis 17 and the other (W) predefines the angular position of the electron beam 12 in the reference plane perpendicular to the beam direction with respect to the reference direction lying in this plane.

The various control units 26 to 32 are connected to a main controller 34, which controls the operation of the electron beam machine. The operation of the main controller 34 can be checked on a screen 36 and influenced by a keyboard 38.

A data memory 40 may contain data and programs for different machining operations.

Sensors that are not represented any more specifically in the drawing, such as that shown by way of example at 42, may be connected to the main controller 34, in order to measure the vacuum in the electron beam machine and other operating parameters of the same. Also connected to the main controller 34 are further controlled loads (not shown) that are necessary for operating the electron beam machine, for example vacuum pumps, servomotors for actuating air locks, transporting devices for work pieces, etc.

Figure 2:
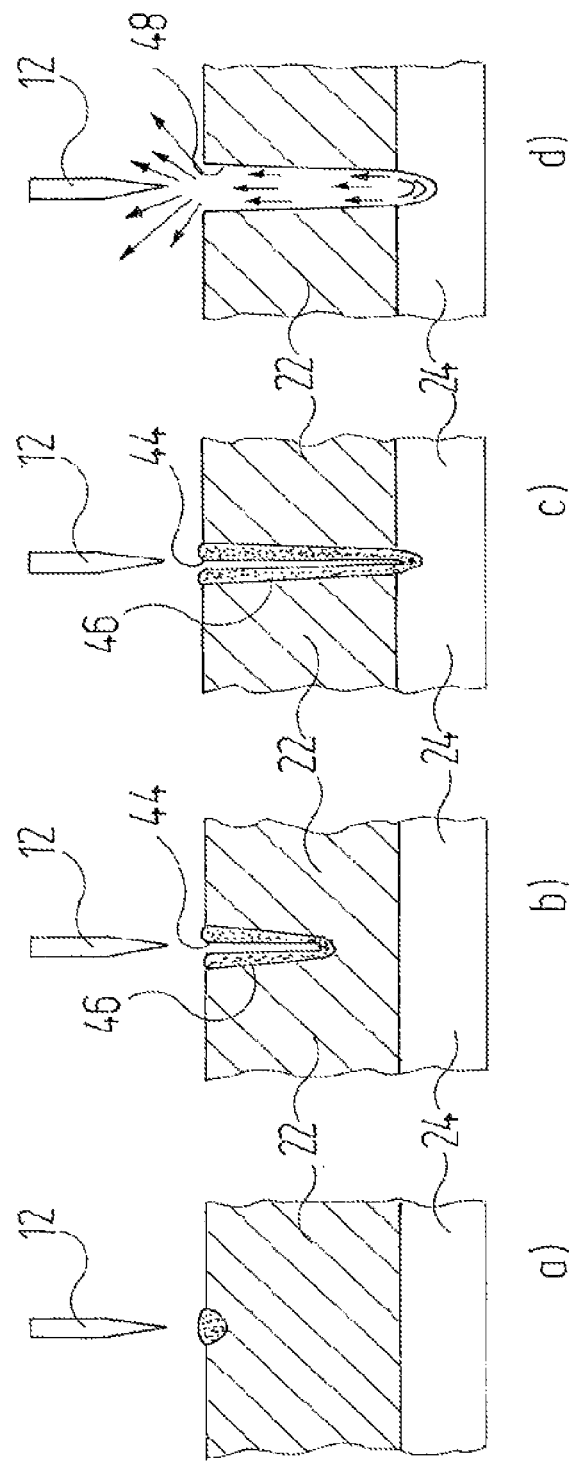
FIG. 2 schematically shows various phases in the production of a bore by means of an electron beam.

FIG. 2 shows four different phases of the production of a bore.

At a), the electron beam has begun to melt a first material region of the work piece 22 on the equipment axis.

At b), there is already a material-free core of a bore in the process of being created, the peripheral region of which is still formed by a hollow molten metal layer 46, which has a slender conical shape.

At c), the electron beam 12 has melted through the material of the work piece 22 to the rear side and reached the uppermost region of the underlay 24.

Since the underlay 24 is produced from a material that can be easily vaporized by the electron beam, for example a metal that vaporizes at low temperatures, there then occurs a relatively great amount of metal vapour, which blows out the liquid metal layer 46, as shown at d).

The following come into consideration in particular as the material for the underlay 24: plastics, in particular epoxy resins, silicone compounds, gypsum or crystalline materials that contain water of crystallization, brass, coatings, films or sheets that comprise a solid filler of particles of the aforementioned materials, and also mixtures of the aforementioned materials.

Particularly preferred are silicone sheets of a thickness of several mm with a high filler content of silica flour.

The underlay is typically in the form of a 2-3 mm thick sheet, which is held up against the underside of the work piece 22 by an air cushion (not shown). The thickness of the underlay 22 is dimensioned such that, during the machining operation, it can only be passed through by a fraction of the electron beam, for which purpose the length of the latter is chosen to be only a very short time period longer than the time that is required for the electron beam to reach the underlay.

It is important that the underlay 24 has a very good surface-area form fit with the rear side of the work piece 22.

The bore hole thus completed is designated at d) by 48.

The contour of the bore, that is to say the sectional line of its circumferential surface with the plane of the drawing, can be seen in FIG. 2 at d). To be distinguished from the contour, as stated, is the cross section or the form, which is to be understood here as meaning the shape of a transversal section through the bore hole 48. The bore hole 48 that is shown in FIG. 2 typically has a substantially circular cross section.

When producing the bore according to FIG. 2, from phase a) to phase b) the electron beam 12 is exactly on the equipment axis.

The electron beam 12 is generated in the form of beam pulses, which follow in succession at regular time intervals. Phases a) to d), shown in FIG. 2, are passed through by a single pulse of the electron beam, which is dimensioned in its intensity and duration specifically such that it is sufficient for drilling the bore 48.

The contouring and the cross section of a bore thus produced can be influenced by way of
a) the geometry of the electron beam 12 (cross section and caustic surface),
b) the beam current,
c) the length of the beam pulse,
d) the geometry of the path along which the electron beam is moved over the work piece 22,
e) the velocity with which the electron beam 12 is guided over the work piece,
f) the material properties of the work piece 22,
g) and also to a lesser extent (under the conditions just considered here) by the material properties of the underlay 24.

Figure 3:
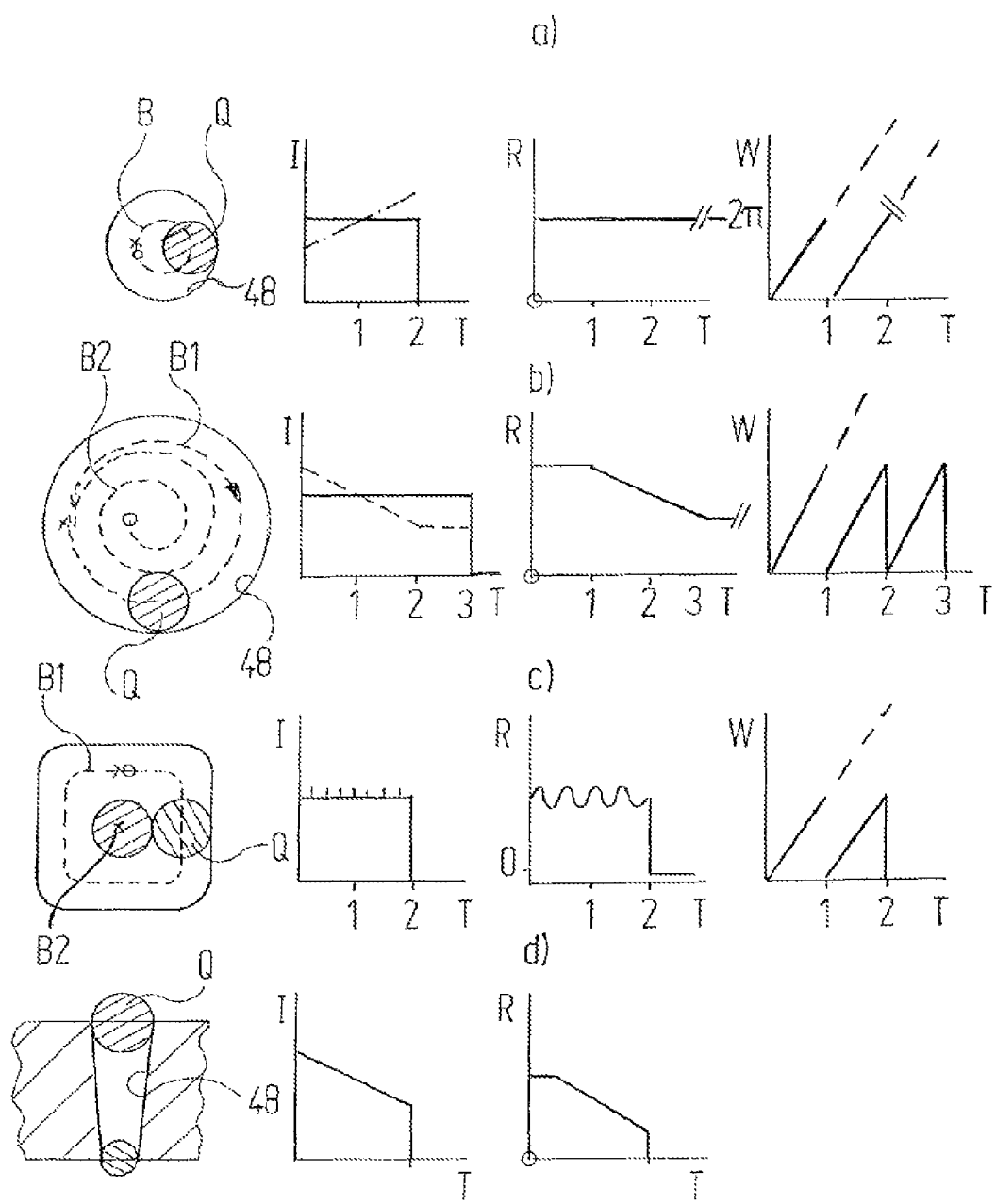
FIG. 3 shows various path curves and diagrams that are used to explain the production of contoured and unround bores.
Figure 3:
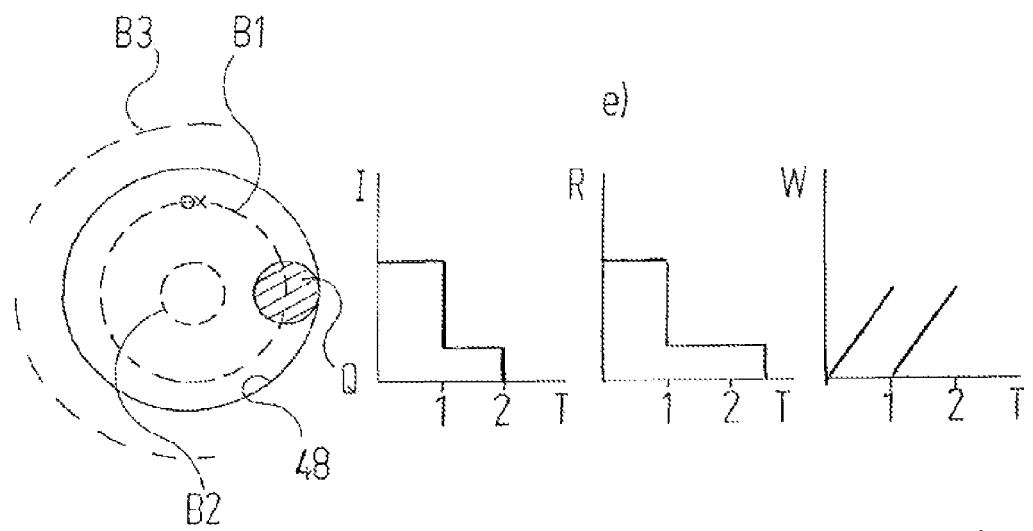

Reference is now made to FIG. 3, which represent the production of bores of various geometries in a work piece by guiding the electron beam on various paths over the work piece, while also altering operating parameters of the electron beam machine.

Throughout this figure, B, B1 and B2 are paths that the electron beam 12 takes on the work piece surface around the equipment axis 18, Q the beam cross section and D the beam diameter, I the beam current, R the radius of the path, W the angle in relation to the point on the path under consideration and 48 the bore.

If bores that have a different contouring or a different cross section are desired, the electron beam 12 is changed in its geometry and/or one or more other operating parameters and/or is guided on a path B that is at a distance from the equipment axis 18.

Represented on the left in the series (a) of FIG. 3 is a circular path B.

The beam current I is maintained every two circulations (two periods) of the beam circulation. Within these two circulations, the material of the work piece is just melted through fully. The size of the beam current is dimensioned such that the material within the circle and a cross-sectionally symmetrical amount of material on the outside of the circular path B are melted.

As a modification, the beam current may also be reduced or increased, as indicated by dashed lines.

After blowing out of the molten material, a bore hole with a slight taper is obtained, as follows from the fact that the material is heated for longer on the entry side of the electron beam than at the exit location of the electron beam into the substrate.

In the second and third representations of the series (a) of FIG. 3, the variation of the distance R and the angle W are plotted over time T, the time unit corresponding to one circulation of the beam.

It can be seen from the middle representation of (a) that the signal R, which sets the radius, can also be sustained beyond the pulse time. A similar situation applies to the last representation of the series (a), since the angle signal W can run on continuously, so that here too no steep signal flanks have to be produced. The representation in solid lines merely corresponds to the customary representation of periodic processes in which multiples of $2\pi$ are subtracted in order to keep down the space required for the representation.

In the case of the exemplary embodiment just described, the radius of the circle in which the electron beam 12 was moved was equal to half the beam diameter. As a modification, the electron beam may also be guided on circular paths of which the diameter is smaller, for example is 10 to 50% of the beam diameter. Smaller holes are then obtained, the circumferential wall of which likewise runs in an obliquely inclined manner.

In the series (b) of FIG. 3, the corresponding conditions for the production of a bore with increased conicity are represented. The electron beam 12 starts at a point that is identified by a small cross and ends at a point that is identified by a small circle.

The electron beam 12 is first guided over 360° on a first circular path B1, on which it melts the work piece to a first depth, which is approximately ⅓ the thickness of the work piece 22.

In a second and third circulation, the radius r decreases continuously, as can be seen from the third representation of the series (b). The cutting depth in this case increases such that at the end of the third circulation the upper side of the underlay 24 is reached.

The angular representation corresponds to that of the series (a).

It can be seen that, beginning from the surface, in this way it is possible to produce a bore which has a greater conicity than corresponds to the conicity that is predefined by the beam geometry and thermal effects. Work is carried out in such a way that within two circulating times the beam runs inwardly.

Making the electron beam move past the first, upper part of the wall of the bore twice or even more frequently also ensures that its surface condition is good.

As a modification of the exemplary embodiment (b) of FIG. 3, the intensity of the electron beam can also be varied in the sense that the current intensity decreases over time (depicted by dashed lines). This also has the effect of increasing the conicity.

As a modification of the example (a) of FIG. 3, the current intensity can be raised or lowered, and thus the conicity of the bore can be increased or reduced, as indicated by dashed lines.

The series (c) of FIG. 3 shows the conditions when producing a substantially square opening. With a constant angular velocity (4th diagram), the deflecting current must be modulated such that, with increasing distance, the beam is moved into a corner and, with decreasing distance R, the beam is moved back from a corner. This can be achieved for example in an approximate form by a sinusoidal modulation, as is indicated in the third representation of the series (c) of FIG. 3.

Being guided along a substantially square path B1 has the effect that, with a predefined angular velocity W, the intensity of the electron beam of each segment of the path changes. In order to compensate for this, the current can be briefly increased in those regions of the path in which a corner of the square is fashioned, as schematically represented in the second representation of the series (c). For the sake of simplicity, sharp peaks P are shown, but in practice they may be smoothed curves that are similar to a bell-shaped curve.

After one circulation on the path B1, the electron beam 12 has been placed on the equipment axis long enough for the material to be melted there precisely as far as along the path B1. This placement on the equipment axis can be formally regarded as the second path B2. The total time for passing through paths B1 and B2 is a cycle time T.

The entire production of the breakthrough is performed again, with a pulse of the electron beam that is two cycle times long. This can be performed such that the depth of the channel produced by the beam after the first cycle has penetrated somewhat further than to the middle of the work piece and then, during the second circulation, penetrates through completely to the upper side of the substrate.

The series (d) shows the production of a bore having a small diameter with relatively great conicity. For this purpose, the electron beam 12 is made to fall on the work piece surface while remaining on the equipment axis 18. In the course of the time in which it acts, the beam diameter D is reduced in size, as is evident from the right-hand partial figure of the series (d). At the same time, the beam current I is reduced, as is evident from the middle figure. At the beginning of the machining, the beam diameter D may be kept constant for a certain time, before it then decreases, as is evident from the third partial figure of the d). The width of the plateau in the curve D(T) allows the conicity of the bore to be set. The changing of the cross section of the electron beam can be produced for example by way of defocusing and focusing the electron beam.

It was explained further above with reference to (b) of FIG. 3 how bores of a cross section that is greater than the beam cross section can be produced.

The series (e) of FIG. 3 shows a further possibility for producing a large bore hole with great conicity, in the case of which the electron beam 12 is guided on two concentric circular paths. Firstly on an outer circular path B1, then on an inner circular path B2.

Also in the case of this path movement, the material within the bore hole is broken up and then, when the electron beam 12 reaches the upper side of the underlay 24, the liquid metal is driven out by the gas then generated.

As represented in the second partial figure of the series (e) of FIG. 3, the beam current is reduced for the inner circular path B2. The reduction is performed such that the beam energy, or rather the beam power, that is made available per unit of travel for the melting of metal (energy per unit length) is the same on all portions of the path.

Such working with constant energy per unit length is generally preferred for the production of bore holes.

When doing so it is also possible to take into account that, in the case of arcuate portions of the beam guiding path, the regions of material that lie on the concave side of the beam path or are surrounded by it are heated up more than the regions of material on the convex side of the beam guiding path.

It will generally be easier to set the constant energy per unit length by way of controlling the beam velocity than by way of the beam current.

It may be advantageous for some applications to work with an energy per unit length that is not constant, in order for example to vaporize more material of the work piece in certain portions of the beam guiding path.

The power per unit length may also be varied over the path traveled during machining, in order for example in the case of corners to be fashioned to keep the path curves simple, and nevertheless melt the material locally more intensely, which produces a bulging of the bore hole. Such a method could be used for example when producing a hole according to series (c) of FIG. 3, in order in spite of guiding the electron beam on a circular path to machine out the four corners of the square that is in fact desired.

In the case of the exemplary embodiments described above, work was always performed with such an adaptation between the path velocity of the electron beam and the length of the beam pulse that the work piece 22 was finished in two or three circulations of the electron beam.

It goes without saying that it is also possible to work with one circulation or with more than three circulations.

It generally applies that, when producing a bore by only one circulation of the electron beam, a wall of the bore of an uneven surface quality is obtained. In the case of two circulations, a much better surface quality is already obtained, and when the surface quality of the wall of the bore has to meet higher requirements it is also possible to produce a bore by two to ten circulations.

With a greater number of circulations, the question arises in the case of work pieces that only have to satisfy average requirements as to whether there is no longer a good balance between the increase in machining time and machining costs and the improvement in the surface quality of the wall of the bore hole. For higher-grade work pieces, for which the quality of the wall of the bore is most important, it is quite possible however also to work with around 10, around 20 or up to 50 circulations. In this case, the beam power can then be reduced the beam power for those circulations in which significant amounts of material are no longer removed and which serve more for smoothing the wall of the bore.

In the case of the exemplary embodiments described above, the beam was switched off entirely when the production of the bore was complete. In some cases, in which it matters that no major stresses that could later lead to a rupturing of the material build up in the material around the bore, it may be advantageous to allow the electron beam to carry out one or more circulations over the regions of the work piece that are adjacent to the bore hole in order to slow down the fall in temperature there.

Such temperature-control cycles are carried out with reduced beam power, so that no appreciable further removal of material from the work piece takes place. A corresponding temperature-controlling path is represented in series (e) of FIG. 3 at B3 over 180°.For such temperature control, the beam current is reduced and/or the beam velocity is increased and/or the beam cross section is increased.

Some numerical examples of operating parameters are given below by way of example:
thickness of the work piece 0.8 mm to 4 mm
acceleration voltage 120 kV
length of the beam pulse 1 µs to 1 ms
beam diameter >40 µm
material of the underlay: 2 to 3 mm thick sheet of silicone compound with 80 to 90% filler particles of gypsum and/or brass
typical diameter of bores produced 80 µm to 1200 µm The following sentences describe further aspects according to the invention of the method in a more generalized form. The applicant reserves the right to direct claims to any of the aspects described in the following sentences:

1. A method for producing small bores (48) in work pieces (22) by using an electron beam (12), in which
a) the work piece (22) is placed onto an underlay (24), which releases a gas when energy is supplied; and
b) the electron beam (12) is directed onto the work piece (22) until it reaches the underlay (24).
2. The method as claimed in sentence 1, characterized in that at least one operating parameter that is selected from the following group of parameters is changed: beam diameter, beam current, pulse duration, beam focusing, relative deviation of the electron beam (12) from an equipment axis (18), path velocity of the electron beam (12) over the work piece (22) and energy per unit length.
3. The method as claimed in sentence 1 or 2, characterized in that two or more operating parameters of the group of parameters are changed.
4. The method as claimed in sentence 3, characterized in that at least two of the changed operating parameters are changed at the same time.
5. The method as claimed in sentence 3 or 4, characterized in that at least two of the changed operating parameters are changed one after the other.
6. The method as claimed in one of sentences 1 to 5, characterized in that the change is performed within a beam pulse.
7. The method as claimed in one of sentences 1 to 6, characterized in that the machining time comprises two or more movement cycles of the electron beam (12) over the work piece (22), preferably 2 to 50 movement cycles, more preferably to 20 movement cycles, more preferably 2 to 10 movement cycles.
8. The method as claimed in sentence 7, characterized in that in a first beam run the work piece (22) is only melted incompletely over its thickness and in a final circulation of the beam, preferably toward its end, the surface of the underlay is reached.
9. The method as claimed in sentence 7 or 8, characterized in that, in at least one of the last cycles, preferably the last five cycles, the electron beam (12) is advanced in the radial direction by a distance that corresponds to a small fraction of the beam diameter, preferably approximately 2% to approximately 5% of the beam diameter.
10. The method as claimed in one of sentences 1 to 9, characterized in that the bore (48) is produced by two, three, etc. successive beam pulses.
11. The method as claimed in sentence 10, characterized in that, with the first beam pulse, the work piece is melted to a depth that is at least approximately half, one third, etc. of the thickness of the work piece, though the underlay (24) is not yet reached, and, with the second, third, etc. beam pulse, the melting through of the remaining piece of material to the underlay (24) takes place and the walls of the part of the bore (48) produced by first preceding beam pulses are passed over.
12. The method as claimed in sentence 11 and sentence 2, characterized in that the second, third, etc. beam pulse differs from the first beam pulse by one of its parameters selected from the stated group of parameters.
13. The method as claimed in sentence 12, characterized in that the movement velocity and the path on which the electron beam (12) is guided for the purpose of the machining are made to match one another such that at least one portion of the bore is passed over twice during the production of the same.
14. The method as claimed in one of sentences 1 to 13, characterized in that the path of the electron beam (2) is run through incrementally.
15. The method as claimed in one of sentences 1 to 14, characterized in that the electron beam (12) is guided successively on paths of which the spacing in the direction perpendicular to the direction of movement of the beam is smaller than the beam diameter, preferably 10 to 40% of the same, more preferably 15 to 25% of the same.
16. The method as claimed in one of sentences 1 to 15, characterized in that, after completion of the bore, the electron beam (12) is guided over the periphery of the material surrounding the bore, preferably with reduced energy in such a way that the material of the work piece is not melted and not vaporized.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A method for producing small bores in work pieces by using an electron beam, the method comprising the steps of:
a) placing a work piece on an underlay, the underlay releasing a gas when energy is supplied to the underlay; and
b) directing an electron beam onto the work piece until the electron beam reaches the underlay and the gas is released from the underlay; wherein
c) at least one operating parameter that is selected from the following group of parameters is changed: beam diameter, beam current, pulse duration, beam focusing, relative deviation of the electron beam from an equipment axis, path velocity of the electron beam over the work piece and energy per unit length; and
d) the change is performed within a beam pulse.
2. The method according to claim 1, wherein two or more operating parameters of the group of operating parameters are changed.
3. The method according to claim 2, wherein at least two of the two or more operating parameters are changed at the same time.
4. The method according to claim 2, wherein at least two of the two or more operating parameters are changed one after the other.
5. The method according to claim 1, wherein a machining time comprises two or more movement cycles of the electron beam over the work piece.

6. The method according to claim 5, wherein in a first beam run the work piece is only melted incompletely over its thickness and in a final circulation of the electron beam, preferably toward its end, a surface of the underlay is reached.

7. The method according to claim 5, wherein in at least one of the last cycles the electron beam is advanced in a radial direction by a distance that corresponds to a small fraction of a diameter of the electron beam.

8. The method according to claim 1, wherein a bore is produced by at least two successive beam pulses.

9. The method according to claim 8, wherein a first beam pulse melts the work piece to a first depth that is less than a thickness of the work piece, though the underlay is not yet reached, and subsequent beam pulses melt through the remaining thickness of the work piece of material to the underlay, and walls of a part of the bore produced by any first preceding beam pulses are passed over.

10. The method according to claim 9, wherein each subsequent beam pulse of the at least two beam pulses differs from the first beam pulse by one parameter selected from the group of operating parameters.

11. The method according to claim 10, wherein a movement velocity and a path on which the electron beam is guided for the purpose of machining are made to match one another such that at least one portion of the bore is passed over twice during the production of the bore.

12. The method according to claim 1, wherein a path of the electron beam is run through incrementally.

13. The method according to claim 1, wherein the electron beam is guided successively on paths of which the spacing in a direction perpendicular to a direction of movement of the electron beam is smaller than a diameter of the electron beam.

14. The method according to claim 1, wherein after completion of a bore, the electron beam is guided over a periphery of material surrounding the bore, preferably with reduced energy in such a way that the material of the work piece is not melted and not vaporized.

15. The method according to claim 1, wherein a machining time comprises 2 to 50 movement cycles of the electron beam over the work piece.

16. The method according to claim 1, wherein a machining time comprises 2 to 20 movement cycles of the electron beam over the work piece.

17. The method according to claim 1, wherein a machining time comprises 2 to 10 movement cycles of the electron beam over the work piece.

18. The method according to claim 7, wherein the electron beam is advanced in the radial direction by a distance that corresponds to approximately 2-5% of the diameter of the electron beam.

19. The method according to claim 1, wherein the electron beam is guided successively on paths of which the spacing in a direction perpendicular to a direction of movement of the beam is 10-40% of a diameter of the electron beam.

20. The method according to claim 1, wherein the electron beam is guided successively on paths of which the spacing in a direction perpendicular to a direction of movement of the beam is 15-25% of a diameter of the electron beam.

21. The method of claim 1, wherein the electron beam forms a bore in the work piece and changing the at least one operating parameter of the electron beam during formation of the bore in the work piece causes the bore to be formed in a conical shape.

22. The method of claim 1, wherein the electron beam forms a bore in the work piece and changing the at least one operating parameter of the electron beam during formation of the bore in the work piece causes the bore to be formed in one or more of a conical shape, a frustoconical shape, with convex walls or concave walls.

* * * * *